United States Patent [19]

Benuzzi

[11] 4,297,928
[45] Nov. 3, 1981

[54] GUARD FOR SAWING MACHINES

[75] Inventor: Gino Benuzzi, Bologna, Italy

[73] Assignee: Giben Impianti S.p.A., Pianoro, Italy

[21] Appl. No.: 154,158

[22] Filed: May 28, 1980

[51] Int. Cl.³ .................... B27B 11/10; B27B 5/29
[52] U.S. Cl. ................................ 83/57; 83/380; 83/397; 83/399; 83/478
[58] Field of Search ............... 83/57, 62, 68, 380, 83/397, 399, 400, 478, 544

[56] References Cited

U.S. PATENT DOCUMENTS

| 3,865,161 | 2/1975 | Vizziello | 83/478 X |
| 3,946,631 | 3/1976 | Malm | 83/397 X |
| 4,214,493 | 7/1980 | Elhaus | 83/478 X |

Primary Examiner—James M. Meister
Attorney, Agent, or Firm—Pollock, Vande Sande & Priddy

[57] ABSTRACT

The invention relates to a sawing machine of the type comprising a horizontal workpiece support table (1) presenting a straight longitudinal slot (2) defining a cutting line, a sawing tool (4) mounted on a carriage (6) reciprocably movable along a path parallel to and beneath the cutting line, and a longitudinal pressure bar (3) arranged above the workpiece support table (1) which pressure bar (3) extends along the whole length of the cutting line and can be raised and lowered with respect to the said workpiece support table (1) so as to be capable of blocking thereon the workpiece (P) to be sawed. In the sawing machine there is provided a first safety device, consisting of a protective apron extending along both sides of the cutting line, the protective apron being formed by a plurality of slats (10) hingedly mounted, swinging movement through a predetermined angle of oscillation, on longitudinal apron rods (7). A second safety device of a longitudinal inner contact bar (14) and a longitudinal outer contact bar (13) mounted on each side of the pressure bar (3) hanging therefrom with possibility of vertical movement. The inner and outer contact bars (13, 14) are adapted to cooperate, after being lifted, with control devices (19, 20) acting on the control circuit of at least the cutting saw (6).

10 Claims, 6 Drawing Figures

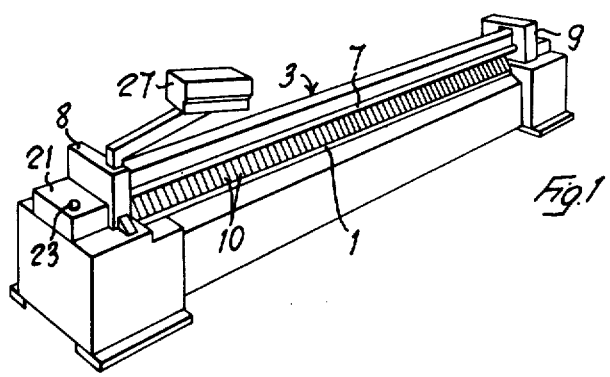
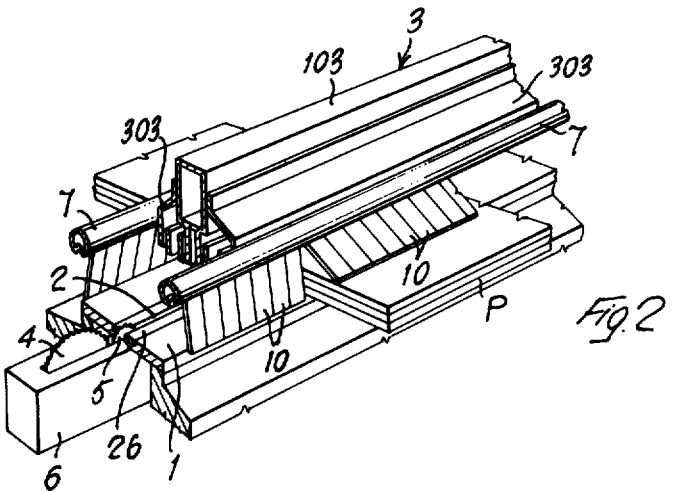
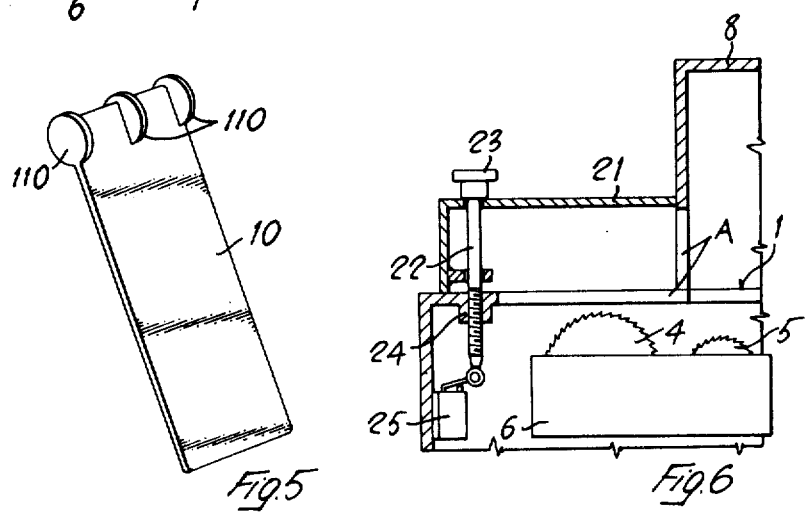

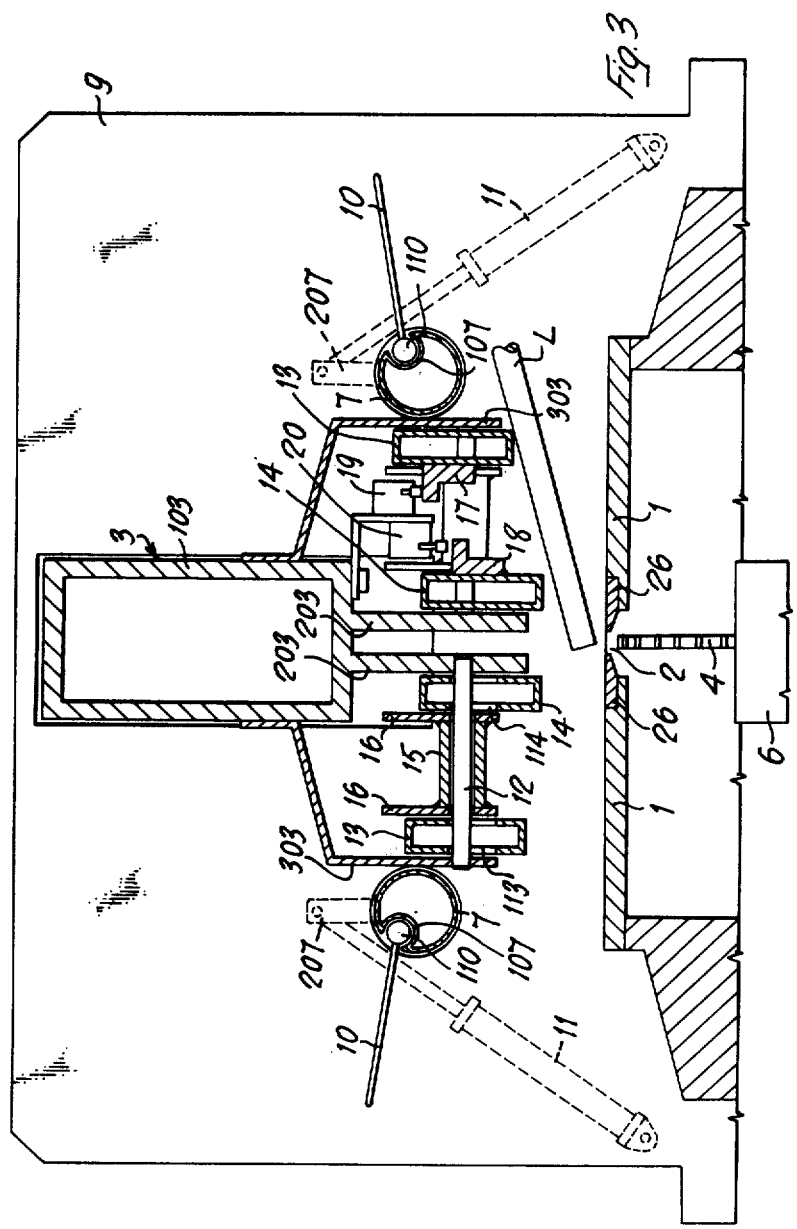

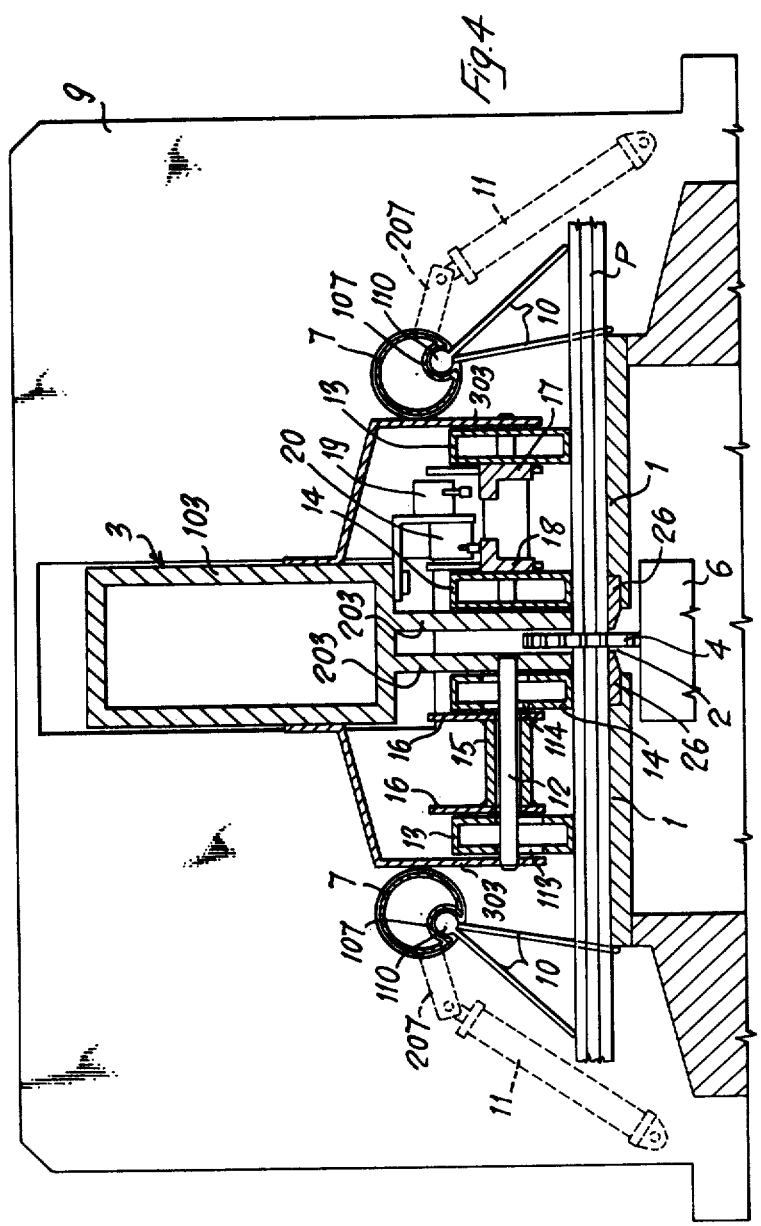

GUARD FOR SAWING MACHINES

SUMMARY OF THE INVENTION

The present invention relates to improvements in sawing machines of the type comprising a horizontal workpiece support table having a straight longitudinal slot defining a cutting line, a sawing tool mounted on a carriage reciprocably movable along a path parallel to and beneath the cutting line, and a longitudinal pressure bar arranged above the said workpiece support table, which pressure bar extends along the whole length of the cutting line and can be raised and lowered with respect to the said workpiece table so as to be capable of blocking thereon the workpiece to be sawed.

More particularly, the invention relates to safety devices which can be adopted in the sawing machines of the above mentioned type.

According to a first aspect of the invention, there is provided a protective barrier apron which covers both sides of the cutting line. The protective apron consists of two apron rods arranged above the cutting line, at the sides of the pressure bar. On the apron rods, a plurality of slats, arranged side by side are hingedly mounted, with possibility of for swinging movement within a predetermined sector around a longitudinal axis parallel to or coincident with the axis of the apron bar. The apron rods may be rotated so as to bring the slats from a raised position, in which there is free access to the cutting line, to a lowered position, in which the slats forming the apron rest either on the workpiece being sawed or on the workpiece table, and in any case do not permit access to the cutting line during the working cycle of the cutting tools. The rotation of the apron rods, and consequent raising or lowering of the apron slats, is coordinated with the raising or lowering movement of the pressure bar.

According to a second aspect of the invention, mounted on each side of the pressure bar are contact bars which extend along the entire length of the pressure bar, and are movable therewith in the raising and lowering motion. The said contact bars are mounted hanging with respect to the pressure bar in such a manner as to be capable of effecting a limited vertical movement. More precisely, on each side of the cutting line, an inner contact bar is arranged in proximity to the cutting line, and whenever the pressure bar is lowered to block the workpiece on the support table, the said inner contact bar comes into contact with the workpiece prior to the pressure bar, is consequently displaced upwardly and acts on a microswitch which controls the operation of the cutting tools. A second, outer, contact bar is located exteriorly with respect to the inner contact bar, and normally hangs from the pressure bar so that its lower end is located at the same level as the lower end of the pressure bar which actually presses and blocks the workpiece. If, during the lowering of the pressure bar, an extraneous body is interposed between the pressure bar and the support table or the workpiece to be sawed, the outer contact bar will be relatively lifted by the presence of said body, with respect to the pressure bar being lowered, and will act on a microswitch which will suitably prevent the operation of the cutting tools.

According to a third aspect of the invention, access for inspection, repair or substitution of cutting tools is permitted only upon removal of a protective hood which is secured to the machine casing by means of a threaded rod the free end of which cooperates with a microswitch controlling the operation of the cutting tools, in such a manner that, upon unscrewing of the threaded rod for removal of the hood, the motors of the cutting tools are stopped, while the unscrewing operation requires sufficient time to allow the cutting tools to come to a complete stop.

BRIEF INTRODUCTION TO THE DRAWINGS

The above and other features of the invention, and the advantages deriving therefrom, are described in detail with reference to the attached drawings, in which:

FIG. 1 is a perspective view of an improved sawing machine according to the invention;

FIG. 2 is a perspective fragmentary view of a detail of the sawing machine;

FIG. 3 is a transverse section of a detail of the sawing machine, with the pressure bar raised;

FIG. 4 is a transverse section of a detail of the sawing machine, similar to FIG. 3, with the pressure bar lowered;

FIG. 5 is a perspective view of a slat forming part of the protective barrier apron provided at both sides of the cutting line of the sawing machine;

FIG. 6 is a section of a detail illustrating the protective hood which prevents access to the cutting tools of the sawing machine.

DESCRIPTION OF PREFERRED EMBODIMENT

With reference to FIGS. 1 to 4, the sawing machine comprises a horizontal workpiece support table 1 having a straight longitudinal slot 2 defining the cutting line. On the workpiece support table 1 there is positioned the workpiece P, normally consisting of a package of stacked wooden boards or the like. The sawing machine further comprises a pressure bar 3 arranged above the workpiece support table 1, which bar 3 can be raised and lowered with respect to the said workpiece support table 1. The pressure bar 3 consists of a longitudinal beam 103 supported by its ends in supports 8 and 9 provided at the ends of the cutting line, means (not shown) being provided for the raising and lowering of the said pressure beam 103. The pressure beam 103 is provided with a pair of lower longitudinal pressure lips 203 extending in the cutting direction on both sides of the slot 2, and defining a longitudinal groove. Upon starting of the machine, the pressure bar 3 is lowered so as to block with its pressure lips 203 the workpiece P on the table 1. When the pressure bar 3 has been lowered, there is immediately promoted the raising of a main circular saw blade 4 and of a scoring tool 5, in the form of a rotating cutting disc or circular saw blade smaller than the main saw blade 4, mounted on a carriage 6 reciprocably movable along a path parallel to and beneath the cutting line defined by the slot 2, so that the said main saw 4 and scoring tool 5 are compelled to move along said slot 2 and effect the sawing of the stacked boards P, while the main saw 4 is at least partially received, during the said sawing operation, in the longitudinal groove defined by the downwardly directed pressure lips 203, as can be seen in FIG. 4.

When sawing has been completed, the main saw 4 and scoring tool 5 are again lowered, and the carriage 6 is returned to its starting position. The pressure bar 3 is again lifted, and the cut boards can be removed or positioned for a further cutting operation. An arrangement of this type, known from British patent specifications Nos. 1,232,800 and 1,426,623, assures an exceptionally clean cut without splitting the cut edges, and renders unnecessary any subsequent treatment of the corners of the single panels obtained, even when handling wooden boards veneered on one or both sides, or coated with a plastic layer.

Whenever the package P of boards to be cut has a width which is less than the length of the workpiece support table 1 of the sawing machine, as illustrated in FIG. 2, the cutting tools 4 and 5 effect an initial portion of their movement in operative position (i.e., projecting above the slot 2) without engaging the package P, presenting danger that the operator may accidentially put his hands across the unoccupied zone of the cutting line (with consequent severe injuries), or that some other extraneous object may accidentically be positioned along the said unoccupied zone of the cutting line, thus damaging the cutting tools.

To obviate the above risks, the invention proposes a protective apron operatively associated with the pressure beam 3 and covering both sides of the cutting line defined by the slot 2. With particular reference to FIGS. 2, 3 and 4, at both longitudinal sides of the pressure bar 3 there are arranged, rotatably supported at their ends by the same upright supports 8 and 9 of the pressure bar 3, two parallel apron rods 7. The said apron rods 7 are preferably tubular and circular in section, and present a longitudinal channel 107 having the section of a sector of more than 180°, so that inside the said retaining channels 107 there may be slidably inserted the discs 110 provided at the ends of the apron slats 10 (see particularly FIG. 5). The said apron slats 10, as shown in FIG. 5, are preferably made of plastic material and, whenever inserted in series by their end discs 110 into the retaining channels 107 of the actuation rods 7, in close side-to-side contact, they define a continuous longitudinal protective apron which covers both sides of the cutting line. The rods 7 may be rotated around their longitudinal axis under the action of an actuating lever 207 which is hinged to the stem of a piston sliding at the interior of a pneumatic cylinder 11 articulated to the frame of the machine and pneumatically connected to the same pneumatic circuits which control the movement of the pressure bar 3.

As can be clearly appreciated from the drawings, the aperture of the retaining channels 107 of the apron rods 7 is such as to ermit a determined amount of swinging of the slats 10 around the swinging axis defined by the said retaining channels 107. Whenever the pressure bar 3 is rased as shown in FIG. 3, the apron rods 7 are rotated so that the barrier apron, formed by the slats 10 on each side of the said pressure bar 3, is lifted by abutment of the slats 10 on one edge of the aperture of channel 107. In this manner, the cutting zone is freely accessible and visible by the operator.

Upon starting of the sawing operation, the pressure bar 3 is lowered, and simultaneously the apron rods 7 are rotated so as to lower the slats, as illustrated in FIG. 4. From the said FIG. 4 and from FIG. 2, it clearly appears that in this lowered position the free ends of the slats 10 either abut against the package P of boards being sawed, or, in the points not occupied by the package P, they swing further downwardly and abut against the workpiece support table 1. In this manner, a continuous protective barrier is established on both sides of the cutting line defined by the slot 2.

The invention relates also to a further safety device for avoiding two other types of accidents during the operation of the sawing machine. The first type of accident may derive from the fact that the cutting tools 4 and 5 could start their sawing action prior to the safe clamping of the package P under the action of the pressure lips 203 of the pressure bar 3. The second type of accident may derive from the fact that the machine could be accidentally started when the operator's hands or other extraneous objects are positioned along the cutting line.

The safety device according to the invention comprises two lateral hood-like elements 303 secured at both sides of the pressure bar 3 and extending for the whole length thereof, terminating at a level higher than the lower (contact) edge of the pressure lips 203 of the pressure bar 3. The hood elements 303 are connected to the sides of the pressure lips 203 by means of a plurality of transverse pins 12, equispaced along the length of the pressure bar. Hanging on the said transverse pins 12 there are provided, for each side of the pressure bar, two longitudinal contact bars 13 and 14. The said contact bars 13 and 14, which in the embodiment shown present a rectangular tubular section, may each be made of a single piece extending along the entire length of the pressure bar 3, or may be segmented into a plurality of pieces, whereby one segment or piece hangs on at least two successive transverse pins 12. The contact bars 13 and 14 on each side of the pressure bar are spaced from one another by means of a spacing sleeve 15 mounted on the pin 12, and are guided for vertical movement by the guide plates 16 provided at the ends of each spacing sleeve 15, so that the outer contact bars 13 are vertically movable in a plane which is close to the side of the hood element 303, while the inner contact bars 14 are vertically movable in a plane which is close to the vertical pressure lips 203 of the pressure bar 3. The contact bars 13 (or segments) hang on the pins 12 by means of through slots 113 which are dimensioned in such a manner that, in the raised position of the pressure bar, shown in FIG. 3, their lowermost extremity is located at the same level as the lowermost end of the pressure lips 203, while the contact bars 14 freely hang on the transverse pins 12 by means of through slots 114 which are dimensioned in such a manner that in the raised position of the pressure bar 3, their lowermost ends project downwardly beyond the ends of the adjoining pressure lips 203. Each contact bar (or segment) 13, 14 is provided with bracket elements 17, respectively 18, intended to cooperate with microswitches 19, respectively 20, upon lifting of the respective contact bars or segments, by abutting against said microswitches. The microswitches 19 and 20 are operatively inserted in the control circuit of the sawing machine, in such a manner that the cutting tools 4 and 5 can start their working cycle only when the pressure bar 3 has been properly lowered onto a package P and no extraneous body is interposed between the pressure bar 3 and the package P, as illustrated in FIG. 4, so that the contact bars 14 have been pushed upwardly with their ends at the same level as the extremities of the pressure lips 203 (which is the top level of the package P), and consequently the microswitches 20 are actuated by the brackets 18, while the outer contact bar 13 are not pushed upwardly, and therefore the microswitches 19 are not actuated by the brackets 17.

FIG. 5 shows an abnormal or emergency condition in which an extraneous body L is present between the pressure bar 3 and the workpiece support table 1. In this case it appears evident that the extraneous body L acts on the outer contact bar 13 (as a result either of the movement of the said extraneous body L, or of the lowering of the pressure bar 3) and practicaly pushes upwardly the said contact bar 13, thus promoting the actuation (through the bracket 17) of the microswitch 19, which will interrupt the operation of the machine, and in any case prevent the cutting tools 4 and 5 (which are rotating) from being lifted through the slot 2 above the table 1.

With particular reference to FIG. 6, there is shown another safety device adopted in the sawing machine, for avoiding injury to the operator whenever it is necessary, either for substitution or repair purposes, to inspect and touch the cutting tools 4 and 5. Access to the said cutting tools is possible only when they are at the starting position of a working cycle, i.e. at in one end of the sawing machine where a protective hood is provided for closing the access aperture A to the said cutting tools. the said hood 21 is secured to the casing of the machine by means of a threaded rod 22, which engages a female nut 24 provided on the machine casing. The threaded rod 22 can be screwed or unscrewed in position by means of a knob 23. Whenever the threaded rod 22 is screwed into locking position, it actuates, with its free end, a microswitch 25 which permits operation of the motors of the tools 4 and 5. Whenever it is desired to have access to the said cutting tools 4 and 5, it is necessary to remove the hood 21, which can be done by unscrewing the rod 22. This causes stoppage of the motors of the tools, through the microswitch 24. The complete unscrewing of the threaded portion of rod 22 takes sufficient time to enable the cutting tools 4 and 5 to come to a complete stop.

As an additional safety measure, in order to avoid sparks from the possible contact of the rotating saw blades 4 and 5 with metal or hard parts of the slot 2 of the table 1, the said slot 2 is defined by two longitudinal strips 26 of relatively soft material, such as wood or plastic.

Reference numeral 27 indicates a control panel board, which is mounted on a swinging arm above the workpiece support table, so that immediate control of the machine can be attained by operators standing on either side of the said machine.

I claim:

1. In a sawing machine of the type comprising a horizontal workpiece support table (1) having a straight longitudinal slot (2) defining a cutting line, a sawing tool (4) mounted on a carriage (6) reciprocably movable along a path parallel to and beneath said cutting line, and a longitudinal pressure bar (3) arranged above said workpiece support table (1), said pressure bar (3) extending along the entire length of said cutting line and movable upwardly and downwardly with respect to said workpiece support table (1) so as to be capable of blocking thereon a workpiece (P) to be sawed, the improvement comprising (a) a first safety device comprising a protective barrier apron extending along both sides of said cutting line, said protective barrier apron comprising a plurality of slats (10) hingedly mounted, for swinging movement through a predetermined angle of oscillation, on longitudinal apron rods (7) arranged at both sides of said cutting line; and (b) a second safety device comprising a longitudinal inner contact bar (14) and a longitudinal outer contact bar (13) hangingly mounted on each side of said pressure bar (3) for vertical movement with respect thereto, said inner and outer contact bars (13, 14) being adapted to cooperate, upon being lifted with control devices (19, 20) acting on the control circuit of at least the cutting saw (6).

2. A sawing machine according to claim 1, wherein said longitudinal apron rods (7) have a longitudinal retaining groove (105) at the interior of which said apron slats (10) are slidably inserted, side-by-side, by means of suitable enlarged portions, such ad discs (110) provided at one end thereof, said retaining groove having an aperture which permits limited oscillation of said apron slats (10) through a predetermined angle, about a longitudinal axis parallel to or coincident with the longitudinal axis of said apron rods (7).

3. A sawing machine according to claim 1, comprising actuating means (11, 207) for actuating limited angular rotation of said apron rods (7) about their longitudinal axis, whereby said apron slats may be raised to a position enabling free access to said cutting line, and lowered to a position at which they abut said workpiece support table (1) and/or said workpiece (P) being sawed.

4. A sawing machine according to claim 1, wherein said pressure bar (3) has a pair of downwardly directed pressure lips (203) for blocking said workpiece (P) on said table (1), the longitudinal inner contact bars (14) of said second safety device being mounted in close proximity to said pressure lips (203) on each side of said pressure bar, in such a manner that whenever said pressure bar is raised with respect to said workpiece (P), said inner contact bars project with their lower ends downwardly beyond the ends of said adjoining pressure lips, and the associated control devices (20) are not actuated, while in the lowered blocking position of said pressure bar (3) said inner contact bars (14) are pushed upwardly by contact with said workiece (P) to be sawed, so that their lower ends are brought to the same level as the ends of said pressure lips (203) and the associated control devices (20) are actuated.

5. A sawing machine according to claim 4, wherein said longitudinal outer contact bars (13) are mounted at both sides of said pressure bar (3) at a distance therefrom, in such a manner that whenever said pressure bar (3) is raised, the lower ends of said outer contact bars (13) are at the same level as the ends of said pressure lips (203) and the associated control devices (19) are not actuated, while the presence of an extraneous body (L) between said pressure bar (3) and said workpiece support table (1) or said workpiece (P) promotes the lifting of at least one of said outer contact bars (13), due to either lowering of said pressure bar (3) or to upward movement of said extraneous body, thereby actuating said associated control devices.

6. A sawing machine according to claim 5, wherein said inner and outer contact bars (13, 14) are mounted, by means of vertical slots (113, 114) passing therethrough, on transverse pins (12) secured at one end to the outer side of said pressure lips (203) and at the outer end to the inner side of a downwardly directed hood (303) secured to said pressure bar (3) and extending longitudinally for the entire length thereof.

7. A sawing machine according to claim 1, further comprising a third safety device comprising a removable hood (21) for closing an aperture which provides access to said sawing tool (4), said hood (21) being secured to the casing of the machine by means of a threaded rod (22) engaging a female nut (24) provided on said casing, said threaded rod being operated through a manual knob, and acting, in its fully screwed condition, on a microswitch (25) enabling the operation of the motors of said sawing tool (4) while the unscrewing of said threaded rod (22) disengages the end thereof from said microswitch, and the complete unscrewing operation requires an amount of time sufficient to allow the sawing tool to come to a complete stop.

8. A sawing machine according to claim 1, wherein the sides of said longitudinal slot (2) comprise strips (26) of relatively soft material.

9. A sawing machine according to claim 8, wherein said material is wood.

10. A sawing machine according to claim 8, wherein said material is a plastic.

* * * * *